United States Patent
Ross et al.

(10) Patent No.: US 8,538,621 B2
(45) Date of Patent: Sep. 17, 2013

(54) CHARGE REMINDER NOTIFICATION TO INCREASE ELECTRIC ONLY EFFICIENCY

(75) Inventors: Steven J. Ross, Livonia, MI (US); Jeffrey G. Ravas, Oxford, MI (US); Dana B. Fecher, Farmington Hills, MI (US)

(73) Assignee: General Motors LLC., Detroit, MI (US)

( * ) Notice: Subject to any disclaimer, the term of this patent is extended or adjusted under 35 U.S.C. 154(b) by 353 days.

(21) Appl. No.: 12/882,920

(22) Filed: Sep. 15, 2010

(65) Prior Publication Data

US 2012/0065831 A1 Mar. 15, 2012

(51) Int. Cl.
- *H01M 10/46* (2006.01)
- *B60R 25/10* (2013.01)
- *G06F 17/00* (2006.01)

(52) U.S. Cl.
USPC .............................. 701/29.1; 701/22; 340/455

(58) Field of Classification Search
USPC ................ 701/30.4, 31.6, 32.3, 32.7, 33.4, 701/36, 29.1, 22; 340/425.5, 438, 455, 870; 455/569.1; 320/109, 132
See application file for complete search history.

(56) References Cited

U.S. PATENT DOCUMENTS

| | | | | |
|---|---|---|---|---|
| 7,623,949 B2* | 11/2009 | Nou | | 701/31.4 |
| 7,849,944 B2* | 12/2010 | DeVault | | 180/65.29 |
| 2005/0128065 A1* | 6/2005 | Kolpasky et al. | | 340/461 |
| 2008/0262668 A1* | 10/2008 | Yamada | | 701/22 |
| 2010/0052848 A1* | 3/2010 | Thunes | | 340/5.64 |
| 2010/0094496 A1* | 4/2010 | Hershkovitz et al. | | 701/22 |
| 2011/0077854 A1* | 3/2011 | Fushiki et al. | | 701/201 |
| 2012/0005031 A1* | 1/2012 | Jammer | | 705/16 |
| 2012/0235806 A1* | 9/2012 | Watson et al. | | 340/441 |

* cited by examiner

*Primary Examiner* — Tan Q Nguyen
(74) *Attorney, Agent, or Firm* — Leydig, Voit & Mayer, Ltd.

(57) ABSTRACT

The described method and system provide a reminder to an electric vehicle user to charge a battery of the electric vehicle to optimize electric-only driving opportunities. The electric vehicle includes a telematics unit, and the vehicle user is associated with a mobile communications device remote from the vehicle. The described technique includes determining a location of the vehicle, comparing the location to a home location of the vehicle user, and retrieving vehicle battery charge state and expected electric only range. If certain conditions are met, the user is prompted via the remote device to plug in the vehicle for charging and/or to alter the vehicle charge profile to achieve full charge in the time remaining.

20 Claims, 4 Drawing Sheets

CHARGE REMINDER NOTIFICATION TO INCREASE ELECTRIC ONLY EFFICIENCY

BACKGROUND OF THE INVENTION

Electric vehicles of all varieties are increasing in visibility and popularity as improvements in electric motor and battery technologies improve the convenience and efficiency of electric drive systems. While further improvements are needed before electric vehicles are equivalent to their fuel powered counterparts on each and every performance measure, successful production-level electric vehicles are now a reality.

One area where electric vehicles continue to lag slightly is in driving range. To date, the energy density of liquid fuels is greater than the energy density available in commercial battery systems, such that even with the greater efficiency of electric vehicles, the driving range between charges is still typically less than that of a similar fuel powered vehicle. Still, the issue of range can be considered to be a question of charging frequency rather than an absolute limit on travel distance. This is especially true when it is considered that most electric vehicles are used for commuter distances on a daily basis, and are not used for long continuous trips.

With respect to hybrid vehicles, the vehicle may continue when the battery is depleted, however, the power mode will become fully or partially fuel powered, reducing the energy efficiency of the vehicle. Thus, for both hybrid and electric-only vehicles, charging frequency may be important. Unfortunately, many electric vehicle users do not remember to regularly charge their vehicle batteries, resulting in excess fuel powered use in the case of hybrid vehicles or limited range in the case of electric only vehicles.

Thus, it is an object to provide an efficient charging schedule and to improve user adherence to such a charging schedule. Although this is an object underlying certain implementations of the invention, it will be appreciated that the invention is not limited to systems that solve the problems noted herein. Moreover, the inventors have created the above body of information for the convenience of the reader and expressly disclaim all of the foregoing as prior art; the foregoing is a discussion of problems discovered and/or appreciated by the inventors, and is not an attempt to review or catalog the prior art.

BRIEF SUMMARY OF THE INVENTION

The invention provides a system and apparatus for reminding an electric vehicle user to charge a battery of the electric vehicle. The electric vehicle includes a telematics unit, and the vehicle user is associated with a mobile communications device remote from the vehicle. The system, which may operate at the telematics unit, includes determining a location of the vehicle, comparing the location to a home location of the vehicle user, and retrieving vehicle battery charge state and expected electric only range.

If the expected electric only range is less than required for an expected driving trip and if the location of the vehicle is within a predetermined threshold of the home location associated with the vehicle user, and if based on a current charge profile and an expected commencement time of the next trip the vehicle battery will reach full charge if the charge is begun within a predetermined time period, then the user is prompted via the remote device to plug in the vehicle for charging if necessary and/or to alter the vehicle charge profile if needed to achieve full charge in the time remaining.

Other objects and advantages of the invention will become apparent upon reading the following detailed description and upon reference to the drawings.

DETAILED DESCRIPTION OF THE INVENTION

Before discussing the details of the invention and the environment wherein the invention may be used, a brief overview is given to guide the reader. In general terms, not intended to limit the claims, the invention is directed to a system and method for providing an efficient charging schedule and improving user knowledge of and adherence to such a charging schedule. In an implementation, an onboard notification, e.g., within the vehicle telematics unit, detects a condition wherein the vehicle may be charged and also detects based on charge state and potential vehicle usage a need to charge. The application notifies the driver or user to configure the vehicle for charging.

By way of example and not limitation, when the electric vehicle is parked in a garage of the user, the remaining range is detected to be less then the expected next daily commute, and the vehicle is detected not to be plugged in for charging, the user may be notified to charge the vehicle.

In determining expected driving tasks and distances, the application relies, in one implementation, on the tracking of user driving habits. In this way, the system may notify users to charge based on driving habits if it is detected that the user may otherwise be unable to complete an upcoming trip in electric only mode. In an implementation, the system not only notifies the user to charge the vehicle but also notifies the user of a remote charge capability.

Thus, instead of requiring users to habitually or regularly charge the vehicle batteries, the system allows users to neglect charging tasks until a reminder is received. The system also notifies a user if a needed charge may be missed based on location and vehicle state after occupant has left vehicle. In addition to improving customer satisfaction due to the ability to use their vehicle when desired, the system also provides cost savings for the customer by allowing more efficient driving, and reduces the environmental impact of driving by reducing fuel usage.

Figure 1:
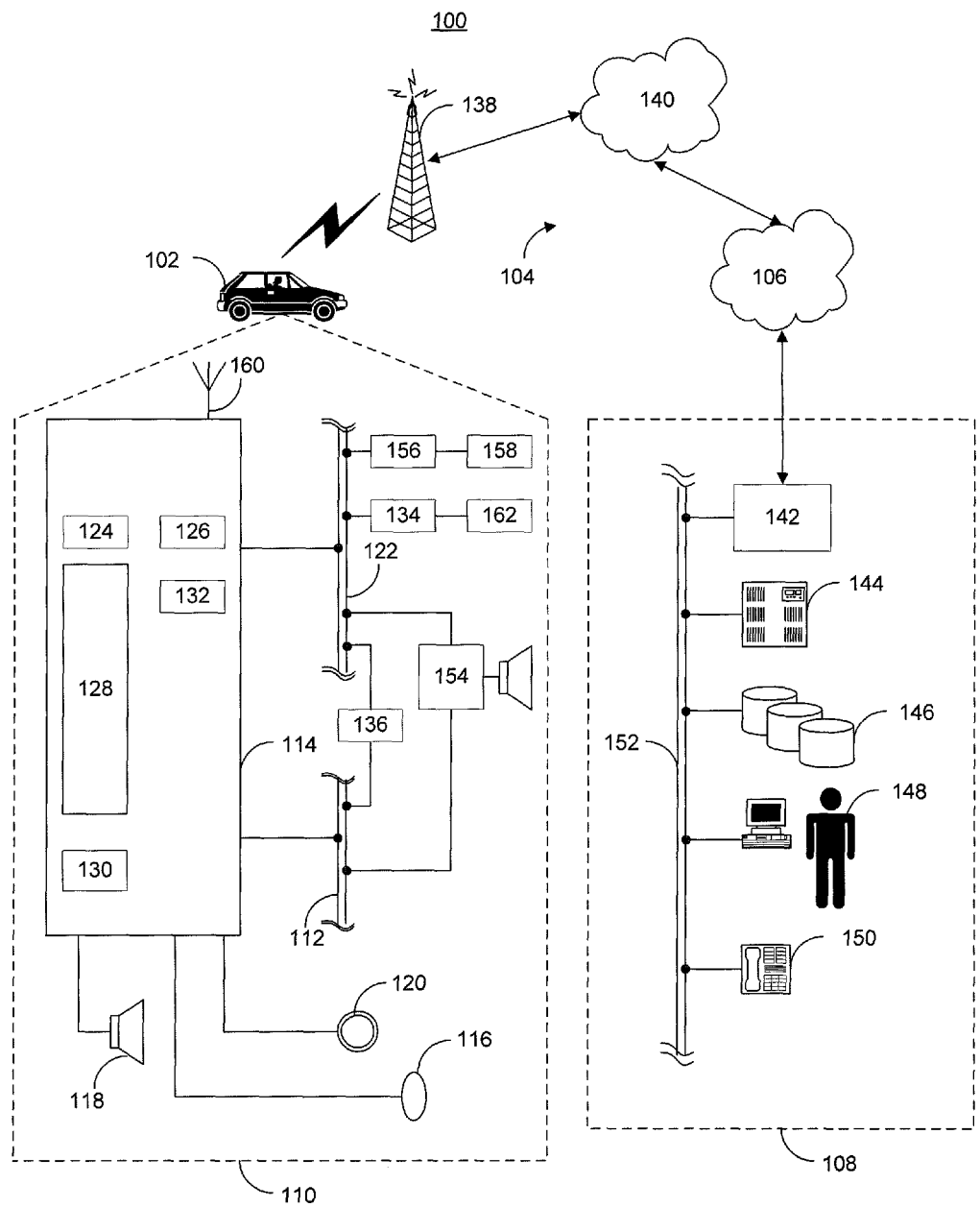
FIG. 1 is a schematic diagram of an operating environment for a mobile vehicle communication system usable in implementations of the described principles.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and system and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include powertrain control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 144.

As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
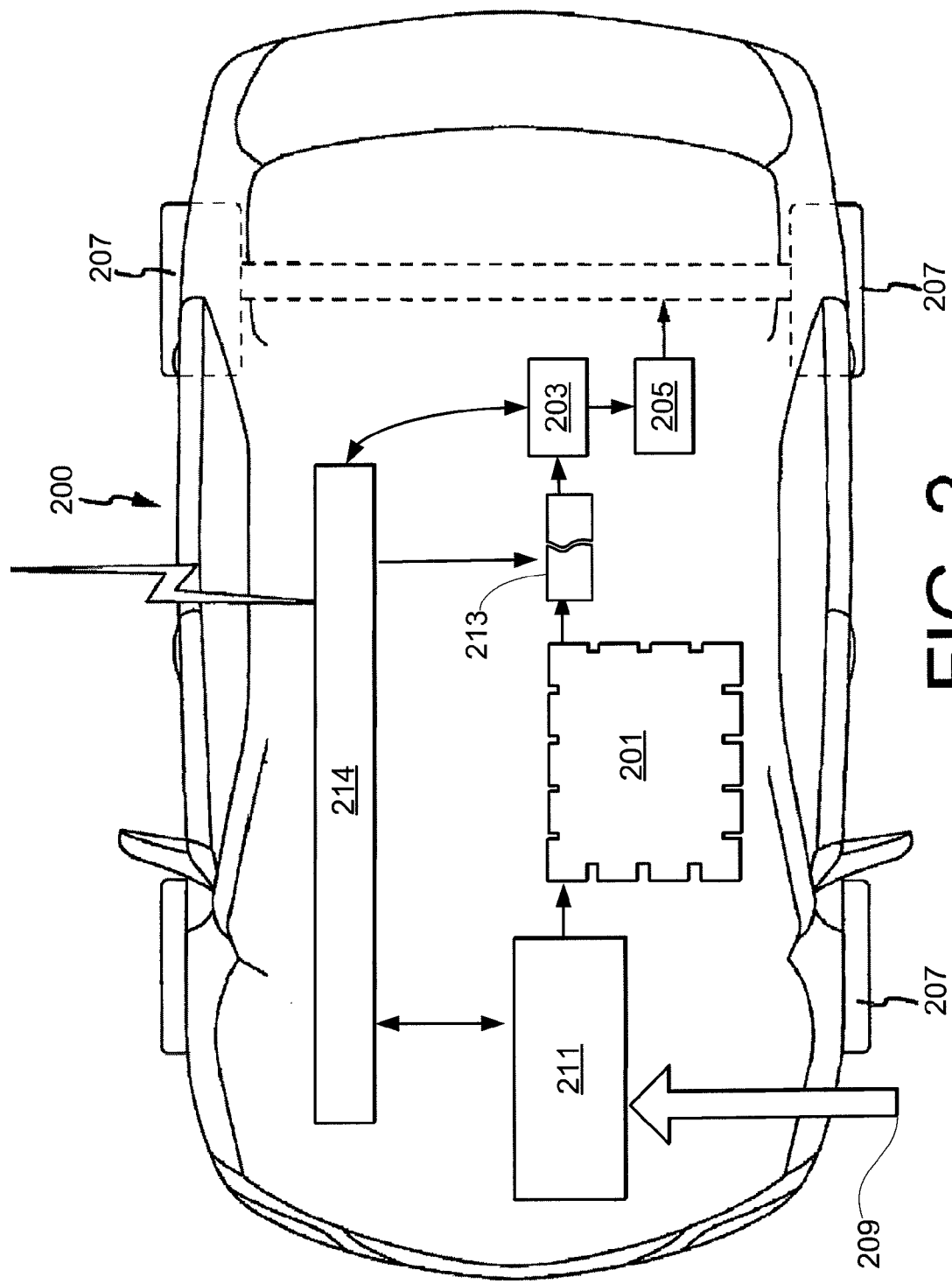
FIG. 2 is a schematic vehicle diagram showing relevant power links and communications linkages within the vehicle and between the vehicle and a remote entity.

As noted above, the telematics unit 114 and associated components are associated in an implementation of the invention with a vehicle 102. In particular, the vehicle 102 is a hybrid-electric or electric vehicle. FIG. 2 is a vehicle schematic showing the components of the vehicle of interest with the respect to the disclosed principles and the manner in which the components may be interrelated to execute those principles. It will be appreciated, however, that the illustrated architecture is merely an example, and that the disclosed principles do not require that the vehicle be configured precisely as shown.

In the illustrated example, the vehicle 200 (102) includes an electrical energy storage system 201 which is a battery or battery bank ("battery") of suitable voltage and capacity. Suitable battery types include but are not limited to lead acid batteries, Nickel Cadmium batteries (NiCd), Nickel Metal Hydride batteries (NiMH), Lithium Ion batteries and Lithium Polymer batteries.

The battery 201 is conductively linkable, e.g., via a motor controller 203, to an electrical drive unit 205, e.g., an electrical motor or motors. The electrical energy may be modulated, voltage-modified, or otherwise modified by the motor controller 203 as needed to drive the electrical drive unit 205. The electrical drive unit 205 is linked or linkable to a ground engaging drive, typically including one or more wheels 207.

In one optional implementation, a plug interface 209 is provided in order to charge the battery 201, although it will be appreciated that the teachings herein apply beyond vehicles having plug-in architectures as well. The plug interface 209 is linked to the battery 201 via a charge controller 211. The telematics unit 214 (114) is adapted to receive information from the controller 211 as discussed above and to convey data regarding the battery as will be discussed more fully hereinafter. An optional aspect of the vehicle 200 and battery 201 is the ability to electrically disconnect the battery 201 from the rest of the vehicle by controlling at least one and preferably two or more high voltage contactors 213 if an adverse condition is detected.

In an implementation, the responsibility for battery charge state sensing and analysis is vested in the charge controller 211. Alternatively, the charge controller 211 may be responsible for sensing battery charge state, while the telematics unit 214 is responsible for analysis of charge state and creation of charge reminders. In either case, the telematics unit 214 is responsible for the transmission of the charge reminder to the user mobile device.

Figure 3:
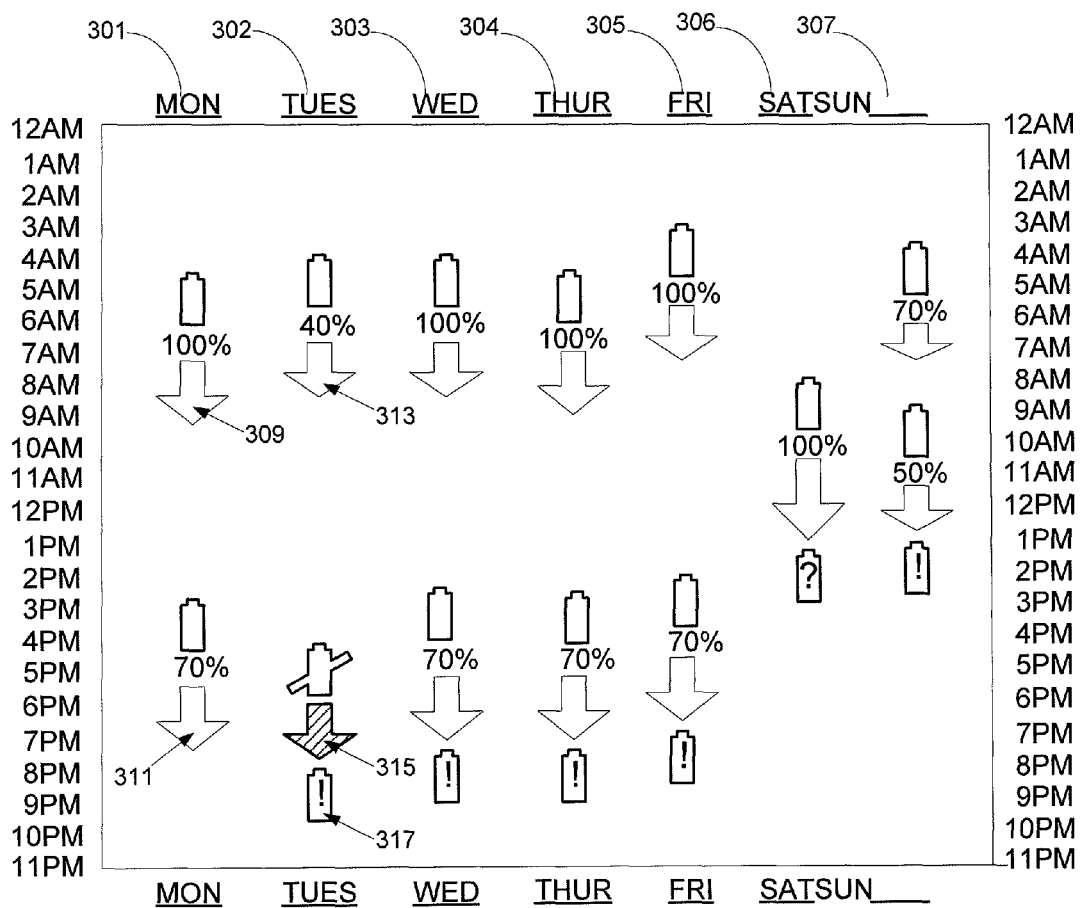
FIG. 3 is a simplified schematic charge usage and scheduling diagram according to an implementation of the described principles.

With further reference to the architecture of FIGS. 1 and 2, and turning more specifically to FIG. 3, a charge usage and scheduling diagram is shown. The scheduling diagram 300 shows an electric vehicle usage schedule for hour of each day of the week, including drive type (electric only, not electric only) and charge reminders.

Thus, for example, on each of Monday (301), Tuesday (302), Wednesday (303), Thursday (304), and Friday (305), the user executes a morning drive 309 and an evening drive 311 of approximately the same distance and duration. This could be due, for example, to a commute to and from the user's place of employment. On the weekend days Saturday (306) and Sunday (307), the vehicle is used more sporadically, but an average weekend driving distance may be determined based on observation over several weekends.

As can be seen, the vehicle starts on Monday 301 fully charged, and is depleted by the day's driving to 40% capacity (reflected in Tuesday's (302) starting charge value. After the first commute 313 on Tuesday (302), insufficient charge is left for the commute home 315, i.e., the commute home 315 cannot be made in electric only mode. The charge controller 211 (or telematics unit 214) detects that the daily driving pattern has resulted in a drive while not fully charged, and schedules a weekday daily reminder 317 to charge for the weekday commute (i.e., reminders will be given on Sunday through Thursday evenings). Although illustrated as occurring over the course of two days, this pattern recognition may occur over a longer period such as a week or more in practice.

A similar learning and reminder process occurs for weekend driving behavior. In this way, an average weekend driving distance may be anticipated and reminder appropriately set. A reminder may or may not need to be given on Saturday (306) depending upon the expected extent of weekend driving and the amount of driving occurring on a given Saturday 306.

Figure 4:
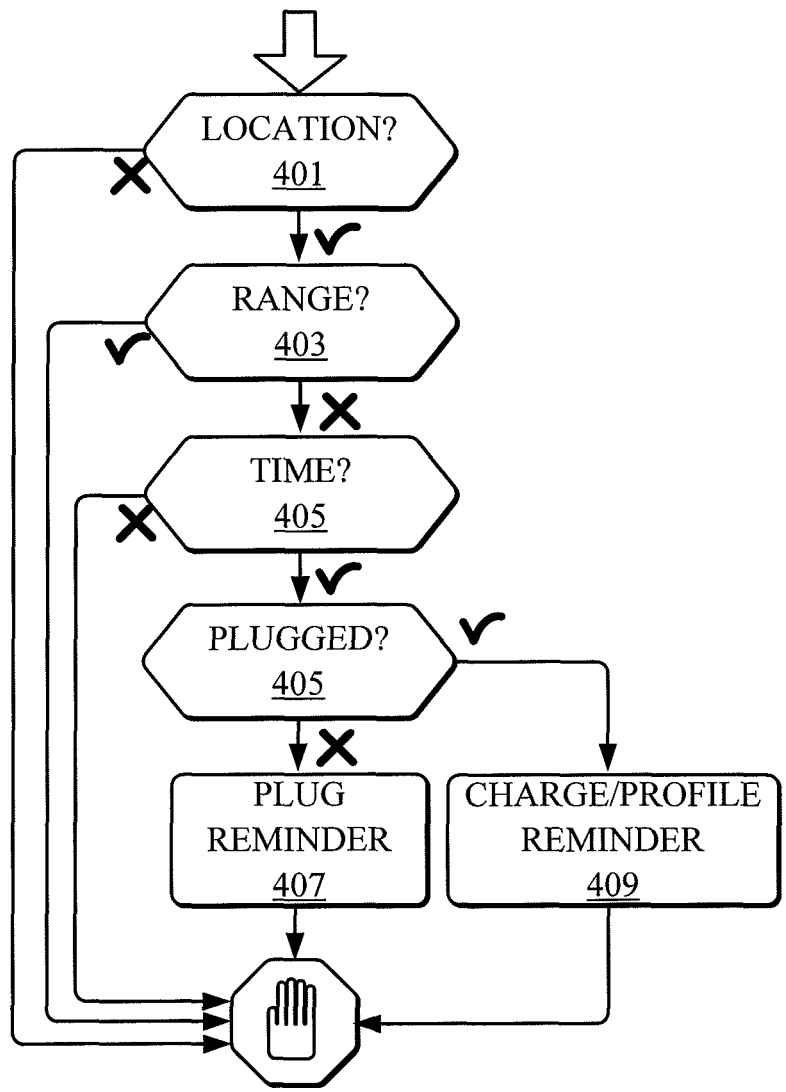
FIG. 4 is a flowchart illustrating a process for determining the timing of a charge reminder to a vehicle user in accordance with an implementation of the described principles.

Turning to FIG. 4, a process 400 is shown for determining the timing of a charge reminder to a vehicle user. At stage 401 of the process, the telematics unit 214 retrieves the location of the vehicle, e.g., as a latitude and longitude, and compares that location to the user's home location. If the vehicle's location is within a predetermined threshold of the user's home location, e.g., within 100 feet, the process flows to stage 403, wherein the telematics unit 214 retrieves the vehicle charge state and expected electric only range from the charge controller 211 and determines whether the expected range is less than the next expected trip, e.g., the next morning's commute, or a regular weekend trip, such as to a church, synagogue, beach, etc.

If it is determined at stage 403 that the expected range is less than the next expected trip, then the process flows to stage 405, wherein the telematics unit 214 determines based on the current charge profile and the expected timing of the next trip, whether the vehicle will reach full charge if the charge is started within a predetermined time period, e.g., an hour. If it is determined that the vehicle will reach full charge if the charge is started within the predetermined time, the telematics unit 214 then determines if the vehicle is plugged in at stage 407.

If the vehicle is not plugged in, the telematics unit sends the user a reminder to plug the vehicle in at stage 409. If the vehicle is plugged in, but the charge profile is insufficient (e.g., not currently charging or not charging fast enough) to assure a full charge, the charge profile is changed at stage 411. Alternatively, the system, via telematics unit 214, may send a notification to the user to begin charging or change the profile as needed.

In an implementation, the user accesses the application at the vehicle telematics unit and inputs certain information to assist in the reminder generation process. This user input may be at the device itself or over a network, e.g., from a personal computer, cellular telephone, or other remote device. Via the chosen means, the user registers information for notification. For example, the user may input a phone number for SMS notification, an email address for textual notification, and/or a phone number for voice call notification. The supplied phone numbers may be the same or different, and may be associated with one or multiple devices.

The user may also register notification period information. For example, the user may specify that they should not be notified during a certain window, such as during a recurring meeting or activity time. As another example, the user may request that they not be notified after 11 PM (i.e., they do not wish to be awakened in order to charge their vehicle). Because a full charge may be preferred, the user may also request to be reminded at least a predetermined amount of time, e.g., 1 hour, before the full charge time would not be available, taking into account the differences between the 220 volt and 110 volt full charge times.

It will be appreciated that the described system allows an electric vehicle user to appropriately charge the vehicle battery as needed, without excess charging time, to facilitate greater electric-only range. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for reminding an electric vehicle user to charge a battery of the electric vehicle, the electric vehicle having a telematics unit associated therewith and the vehicle user being associated with a mobile communications device remote from the vehicle, the method comprising:
   determining a location of the vehicle at the telematics unit;
   comparing the location of the vehicle to a home location associated with the vehicle user, the home location being a physical location where the user may charge the vehicle battery;
   retrieving a vehicle battery charge state and expected electric only range and determining at the telematics unit whether the expected electric only range is less than required for an expected driving trip if the location of the vehicle is within a predetermined threshold of the home location associated with the vehicle user; and
   determining at the telematics unit, if the expected range is less than the next expected trip, based on a current charge profile and an expected commencement time of the next trip, whether the vehicle battery will reach full charge if the charge is begun within a predetermined time period, and if it is determined that the vehicle will reach full charge if the charge is started within the predetermined time, determining if the vehicle is plugged in for charging and sending the vehicle user a reminder from the telematics unit to the mobile communications device to plug the vehicle in if the vehicle is not plugged in.

2. The method according to claim 1, further comprising modifying the charge profile if the vehicle is plugged in, but a charge profile associated with the vehicle battery indicates that a full charge will not be attained prior to the expected trip.

3. The method according to claim 1, further comprising notifying the vehicle user to begin charging if the vehicle is plugged in but not charging.

4. The method according to claim 1, further comprising notifying the vehicle user to modify the charge profile if the vehicle is plugged in, but the charge profile associated with the vehicle battery indicates that a full charge will not be attained prior to the expected trip.

5. The method according to claim 1, further comprising receiving user input specifying information to be used for notification.

6. The method according to claim 5, wherein the information to be used for notification includes at least one of a phone number for SMS notification, an email address for textual notification, and a phone number for voice call notification.

7. The method according to claim 5, wherein the user input specifying information to be used for notification is received via input at the telematics device.

8. The method according to claim 5, wherein the user input specifying information to be used for notification is received at the telematics device over a network from a remote device.

9. The method according to claim 1, further comprising receiving user input specifying notification period information.

10. The method according to claim 9, wherein the notification period information specifies that notifications shall not be sent during a specified period.

11. The method according to claim 1, further comprising receiving user input specifying a lead time by which the user requests any notification be sent.

12. The method according to claim 1, further comprising receiving user input specifying a lead time by which the user requests notification.

13. The method according to claim 12, wherein the lead time represents a predetermined amount of time before a full charge would not be possible.

14. A telematics unit associated with an electric vehicle having a battery for propulsion, and wherein a user having a mobile communications device remote from the vehicle is also associated with the vehicle, the telematics unit including a processor and a computer-readable medium, with computer-executable instructions stored on the computer-readable medium, the computer-executable instructions comprising:
  instructions for determining a location of the vehicle;
  instructions for comparing the location of the vehicle to a home location associated with the vehicle user, the home location being a physical location where the user may charge the vehicle battery;
  instructions for retrieving a vehicle battery charge state and expected electric only range and determining whether the expected electric only range is less than required for an expected driving trip if the location of the vehicle is within a predetermined threshold of the home location associated with the vehicle user; and
  instructions for determining, if the expected range is less than the next expected trip, based on a current charge profile and an expected commencement time of the next trip, whether the vehicle battery will reach full charge if the charge is begun within a predetermined time period, and if it is determined that the vehicle will reach full charge if the charge is started within the predetermined time period, determining if the vehicle is plugged in for charging and sending the vehicle user a reminder at the mobile communications device to plug the vehicle in if the vehicle is not plugged in.

15. The telematics unit according to claim 14, wherein the computer-executable instructions further comprise instructions for modifying the charge profile if the vehicle is plugged in, but a charge profile associated with the vehicle battery indicates that a full charge will not be attained prior to the expected trip.

16. The telematics unit according to claim 14, wherein the computer-executable instructions further comprise instructions for notifying the vehicle user to begin charging if the vehicle is plugged in but not charging.

17. The telematics unit according to claim 14, wherein the computer-executable instructions further comprise instructions for notifying the vehicle user to modify the charge profile if the vehicle is plugged in, but the charge profile associated with the vehicle battery indicates that a full charge will not be attained prior to the expected trip.

18. The telematics unit according to claim 14, wherein the computer-executable instructions further comprise instructions for receiving user input specifying information to be used for notification, wherein the information to be used for notification includes at least one of a phone number for SMS notification, an email address for textual notification, and a phone number for voice call notification.

19. The telematics unit according to claim 18, wherein the user input specifying information to be used for notification is received via input at the telematics device.

20. A method for reminding a user of an electric vehicle to charge a battery of the vehicle, the method comprising:
  receiving at a telematics unit associated with the vehicle user input setting notification information, wherein the notification information includes a number of a remote device associated with the user and reminder timing information;
  tracking vehicle usage and predicting that a charge of the vehicle battery is needed based on the vehicle usage, wherein tracking vehicle usage and predicting that a charge of the vehicle battery is needed based on the vehicle usage further comprises:
    determining a location of the vehicle at the telematics unit;
    comparing the location of the vehicle to a home location associated with the vehicle user, the home location being a physical location where the user may charge the vehicle battery;
    determining that the location of the vehicle is within a predetermined threshold of the home location associated with the vehicle user;
    retrieving a vehicle battery charge state and expected electric only range and determining at the telematics unit that the expected electric only range is less than required for an expected driving trip; and
    determining at the telematics unit, based on a current charge profile and an expected commencement time of the next trip, that the vehicle battery will reach full charge if the charge is begun within a predetermined time period; and
  generating a user reminder to charge the vehicle, and transmitting the user reminder to the user at the remote device associated with the user in keeping with the reminder timing information.

* * * * *